US005282704A

United States Patent [19]

Screen

[11] Patent Number: 5,282,704

[45] Date of Patent: Feb. 1, 1994

[54] PORTABLE DRILLING APPARATUS

[75] Inventor: David A. Screen, 110 Highfields Lane, Chesterfield S41 8BA, England

[73] Assignees: David A. Screen; Michael D. Wooley, both of England

[21] Appl. No.: 887,053

[22] Filed: May 22, 1992

[30] Foreign Application Priority Data

May 31, 1991 [GB] United Kingdom ................. 9111730

[51] Int. Cl.5 ................................................ B23B 47/04

[52] U.S. Cl. ....................................... 408/124; 408/76; 408/138

[58] Field of Search ................. 408/76, 102, 111, 124, 408/129, 135, 136, 137, 138

[56] References Cited

U.S. PATENT DOCUMENTS

| | | | |
|---|---|---|---|
| 919,597 | 4/1909 | Klouse et al. | 408/76 |
| 2,863,338 | 12/1958 | Stewart . | |
| 2,955,491 | 10/1960 | Buck | 408/76 |
| 3,053,119 | 9/1962 | Anderson . | |
| 3,176,547 | 4/1965 | Schnacke | 408/124 |
| 3,455,207 | 7/1969 | Meinke | 408/129 |
| 4,123,187 | 10/1978 | Turner | 408/137 |
| 4,358,228 | 11/1982 | Stark | 408/129 |
| 4,453,868 | 6/1984 | Winslow | 408/138 |
| 4,582,456 | 4/1986 | Imai . | |
| 4,610,580 | 9/1986 | Palm . | |

FOREIGN PATENT DOCUMENTS

| | | | |
|---|---|---|---|
| 042510 | 5/1991 | European Pat. Off. . | |
| 125447 | 2/1900 | Fed. Rep. of Germany | 408/129 |
| 418342 | 12/1910 | France . | |
| 2604 | 1/1988 | Japan | 408/137 |
| 940945 | 11/1963 | United Kingdom . | |

*Primary Examiner*—Daniel W. Howell
*Attorney, Agent, or Firm*—Larson & Taylor

[57] ABSTRACT

Portable drilling apparatus provided with a support by means of which it can be secured to a work member and mounting means for a cutting tool including a mounting member having a vertically extending elongate part within which a drive spindle is rotatably mounted, the drive means including an elongate toothed gearwheel driven by a motor held in a fixed position in the support, a toothed gear carried by the drive spindle engaging the elongate gearwheel and sliding axially relative thereto.

11 Claims, 7 Drawing Sheets

PORTABLE DRILLING APPARATUS

FIELD OF THE INVENTION

This invention relates to a portable drilling apparatus, in particular to drilling apparatus of the kind often used when erecting structural steelwork for a multi-storey building, for example.

Conventional portable electric drills are used for drilling holes during the erection of the steelwork. For reasons of accuracy and safety the drill is not hand-held but is mounted to be axially slideable in a support which is clamped onto the steelwork. It can be particularly convenient to provide such a support having a base plate in which there is an electro-magnetic coil so that the drill spindle can be readily located simply by positioning the base plate and energising the coil. The known apparatus has the disadvantage however that, although the drill is supported, it still has a trailing power supply cable which can obstruct free movement of the drill and which is relatively easily worn or damaged. This can cause problems whether the drive is through an electric motor or a fluid power motor.

An object of the invention is to provide a portable drilling apparatus which will be devoid of the usual flexble power supply cable leading to a motor.

A further object of the invention is to provide a portable drilling apparatus of a particularly compact arrangement which will allow the apparatus to be used where the free height is restricted.

SUMMARY OF THE INVENTION

According to the present invention there is provided a portable drilling apparatus comprising a support provided with means for securing it to a work member, and an axially displaceable drill spindle mounted in the support, a drive motor for the spindle being held in a fixed position in the support, and the spindle being held rotatably in an elongate member slidably engaged by the support for movement in said axial direction, a drive transmission between said motor and spindle comprising an elongate transmission element rotatable on a parallel axis to the spindle and a further rotary element drivingly engaged by the elongate transmission element and displaceable with said elongate member holding the spindle. The motor and the elongate transmission element may be arranged side by side. The elongate and further transmission elements may have intermeshing helical toothing.

Feed means for axial movement of the spindle may be constituted by a screw rotatable about an axis parallel to the axis of the elongate member and having threaded engagement with a nut carried by said elongate member, means being provided for rotating said screw. A plurality of said screws may be disposed symmetrically about the axis of the spindle.

A change speed mechanism may be provided in the drive transmission between the motor and the spindle, said mechanism conveniently being disposed to one side of the motor and spindle rearwards of the spindle.

DESCRIPTION OF A PREFERRED EMBODIMENT

Figure 1:
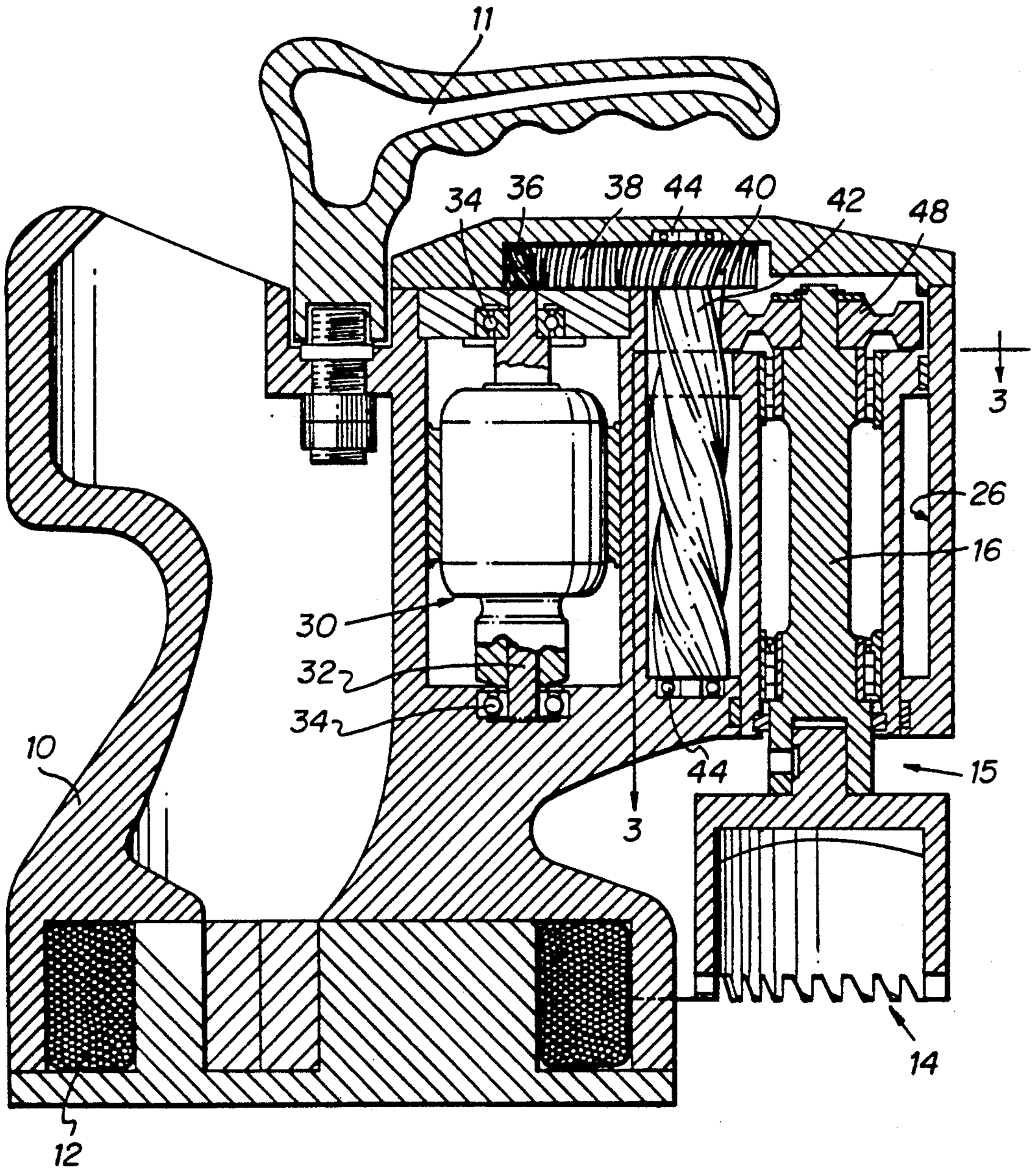
FIG. 1 is a vertical section through portable drilling apparatus embodying the invention, with its cutter in a retracted position.

Referring now to FIGS. 1 to 5 of the drawings, the portable drilling apparatus there illustrated includes an anvil member 10 within a basal part of which are located electric windings, generally indicated 12, which when actuated produce a strong magnetic attraction sufficient to secure the anvil to a ferrous work member, for example tc a metal beam or stancheon forming part of the framework for a multi-storey building in the course of construction.

A head part of the anvil is provided with a carrying handle 11 and contains mounting means, drive means and feed means for a cutter 14 which is secured at the lower end of a drive spindle 16 by adaptor 15.

Figure 5:
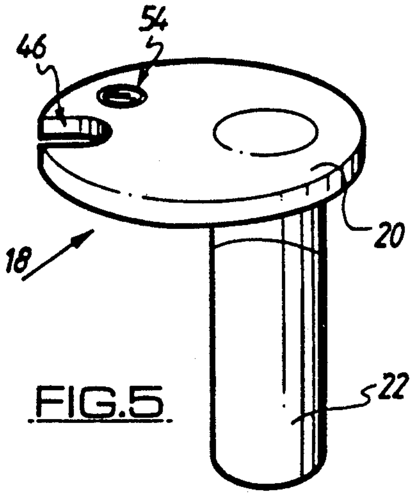
FIG. 5 is a perspective view of a component part of the apparatus.

The mounting means for the cutter 14 are constituted by a mounting member generally indicated 18 and illustrated in perspective view in FIG. 5. Said mounting member has an upper portion 20 in the form of a generally cylindrical disc element formed integrally with an offset cylindrical sleeve 22 within which the drive spindle is rotatably mounted in bearings 24. The upper portion 20 of the mounting member is slidably mounted in a cylindrical blind bore 26 within the head part of the anvil. The cylindrical sleeve 22 is slidable through a bore 28 in a lower wall of said head part.

The drive means for the cutter 14 are best shown in FIG. 1 and comprise an electric motor, generally indicated 30, the rotor 32 of which is vertically mounted in bearings 34,34. A pinion 36 at the upper end of the rotor shaft transmits rotation, via reduction gears 38 and 40, to an elongate helical gear 42 which is mounted vertically, in bearings 44,44, and located within the cylindrical blind bore 26 in which the upper portion 20 of the mounting member 18 is slidably mounted. As shown in FIG. 5, the upper portion of the mounting member is slotted at 46 to provide a clearance aperture through which the elongate helical gear 42 extends.

The upper end of the drive spindle 16, projecting, as shown, beyond the upper end of the mounting member 18, is provided with a helical gear 48 which engages the gear 42. The gears 48 and 42 are maintained in mesh, throughout any vertical adjustment of the mounting member 18 relative to the head part of the anvil, by the sliding of the teeth of the gear 48 relative to the teeth of the elongate gear 42.

Figure 3:
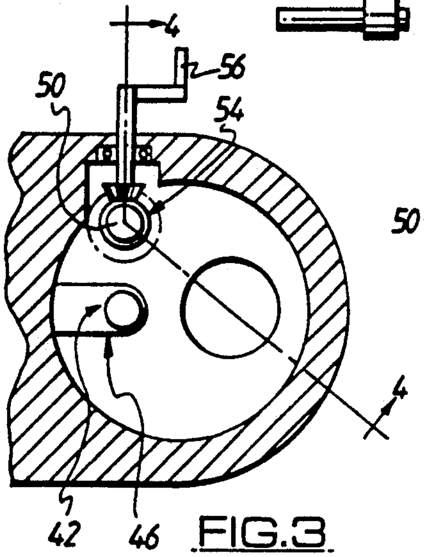
FIG. 3 is a sectional view on the line 3—3 in FIG. 1.
Figure 4:
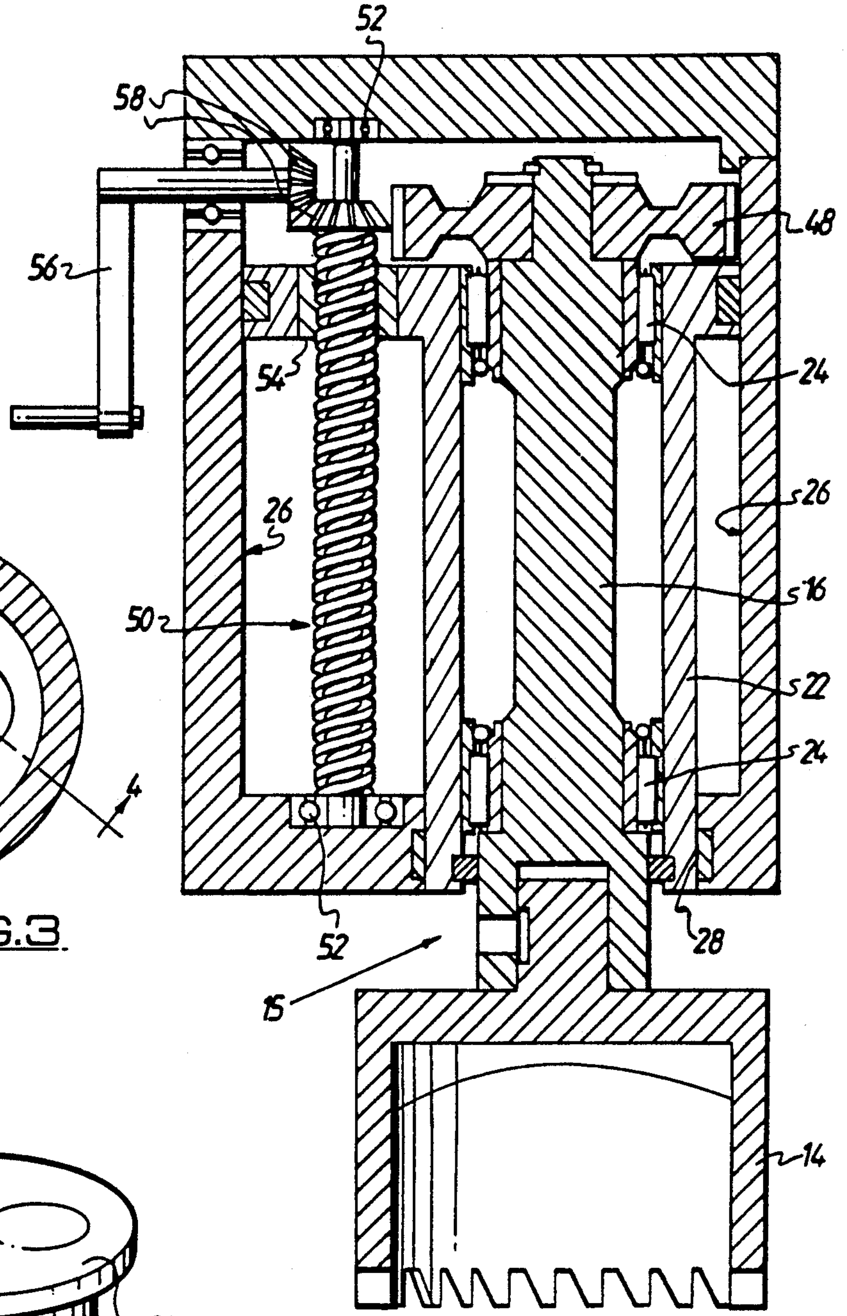
FIG. 4 is a sectional view on the line 4—4 in FIG. 3.

The feed means for the cutter 14 are constituted by screw means for vertically adjusting the position of the mounting member 18 relative to the head part of the anvil and are illustrated in FIG. 3 and 4. The screw means referred to include an elongate square threaded screw 50 which is vertically mounted, in bearings 52,52, and located within the cylindrical blind bore 26 in which the upper portion 20 of the mounting member 18 is slidably mounted. A non-rotatable nut 54, which has threaded engagement with the screw 50, is located within the upper portion 20 of said mounting member.

A handle 56 which extends through a side wall of the head part of the anvil can be used to rotate the screw 50 through a pair of bevel gears 58, 58. As the handle is manually turned, the screw is rotated to lower or raise the mounting member relative to the anvil, depending upon the direction of rotation of the handle. The cutter is thus either advanced downwards into the work surface or retracted therefrom.

Thus there is provided an electro-magnetic drilling apparatus which is particularly simple in design and therefore capable of being produced at relatively low cost. In addition it has the considerable advantage that it is devoid of the usual flexible electric cable leading to an electric motor mounted so as to be adjustable relative to the anvil. Because the great majority of the moving parts are located within the anvil itself, the apparatus is particularly rugged. The apparatus can be expected to be of lighter weight and, because the motor and the elongate transmission element 42 are arranged side by side, of particularly smaller overall height than previously known apparatus of a similar capacity and working stroke.

MODIFICATIONS OF THE PREFERRED EMBODIMENT

Various modifications may be made. For example, it is not essential for the gears 42 and 48 to be helical gears. They could quite well be straight spur gears. It will also be understood that to obviate any risk of the mounting member tilting within the blind bore 26, due to the elongate screw 50 being offset from the axis of the drive spindle, the single screw 50 could be replaced by a pair of such screws located at diametrically opposite locations relative to said drive spindle, means being provided for driving both screws simultaneously by means of the handle 56.

The illustrated embodiment of the invention has been shown to be powered by an electric motor. However, it will be understood that the motor need not necessarily be an electric motor; it could be a fluid motor for example.

The feed means need not necessarily be constituted by a rotatable screw and nut arrangement. A suitable hydraulic feed arrangement could be used.

The illustrated embodiment of the invention has been shown to be provided with an electro-magnetic clamping arrangement whereby it can be secured to a work member. However, such means need not necessarily be electro-magnetic; an arrangement including a permanent magnet or magnets could be used. Indeed, the anvil member could be capable of being secured in position by purely mechanical means such as a screwthreaded clamping arrangement depending on particular requirements.

Figure 2:
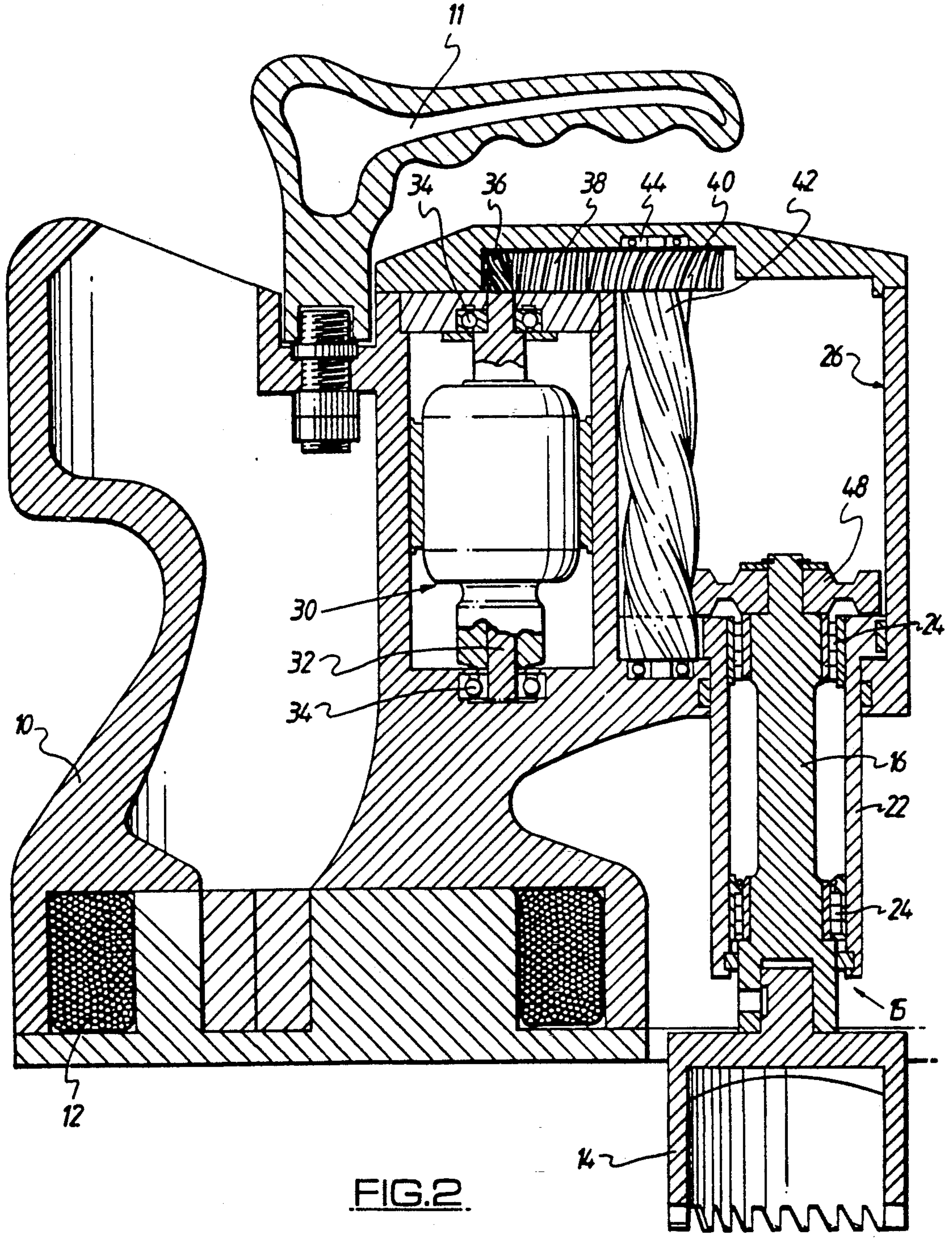
FIG. 2 is a view similar to FIG. 1 but showing its cutter in a fully extended position.

It will be seen in FIG. 2 that the vertical spacing of the bearing surfaces surrounding the upper portion 20 of the mounting member and the cylindrical sleeve 22 has become relatively small when the cutter is fully extended from beneath the head portion of the anvil. To some extent the resultant loss of rigidity will be aleviated by the fact that the cutter itself will be constrained within the bore in the work member (and it will of course be understood that whenever the anvil is secured to the work member by magnetic attraction the work member can be considered to be absolutely rigid).

Figure 6:
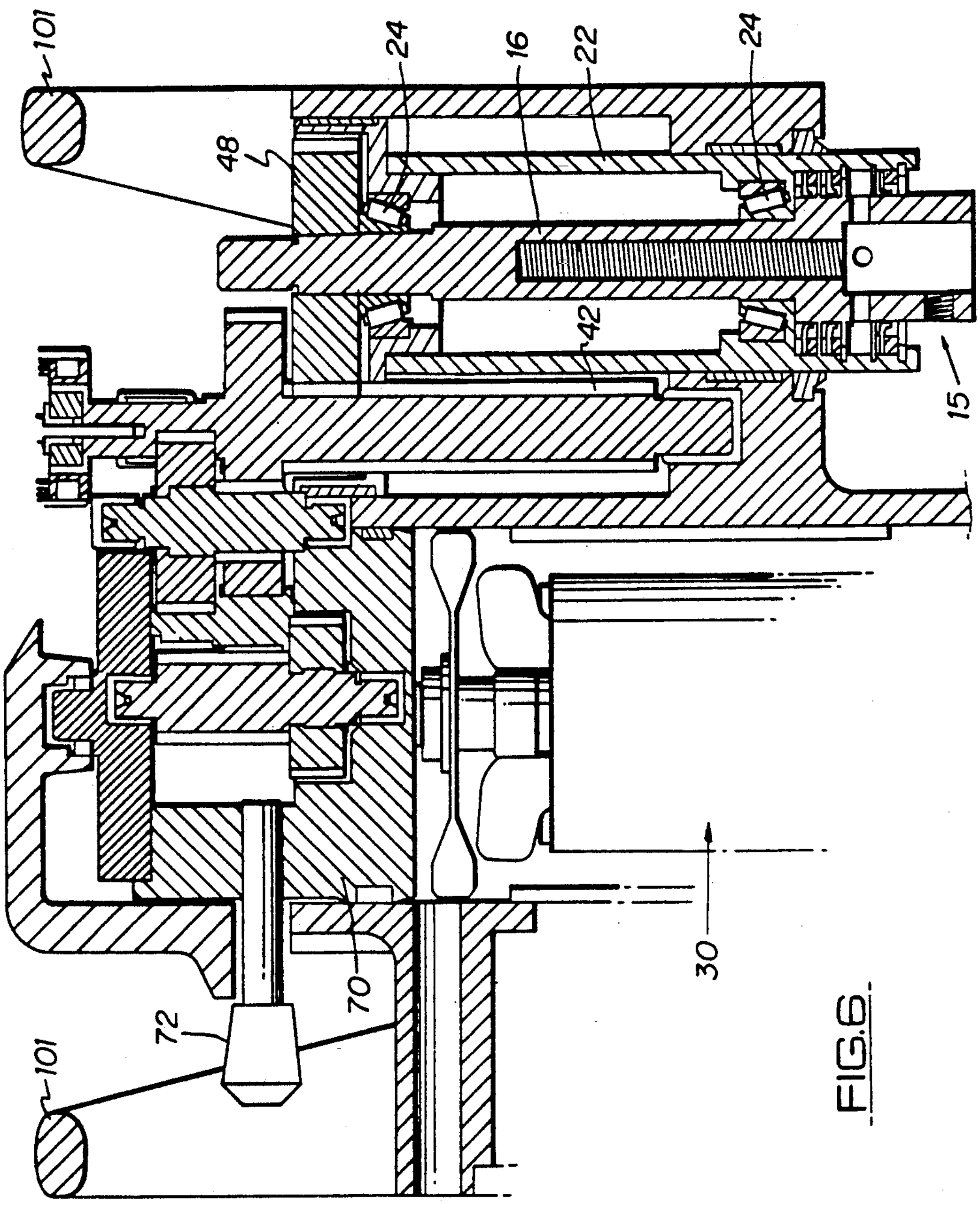
FIG. 6 is a view illustrating a possible modification of the apparatus.
Figure 7:
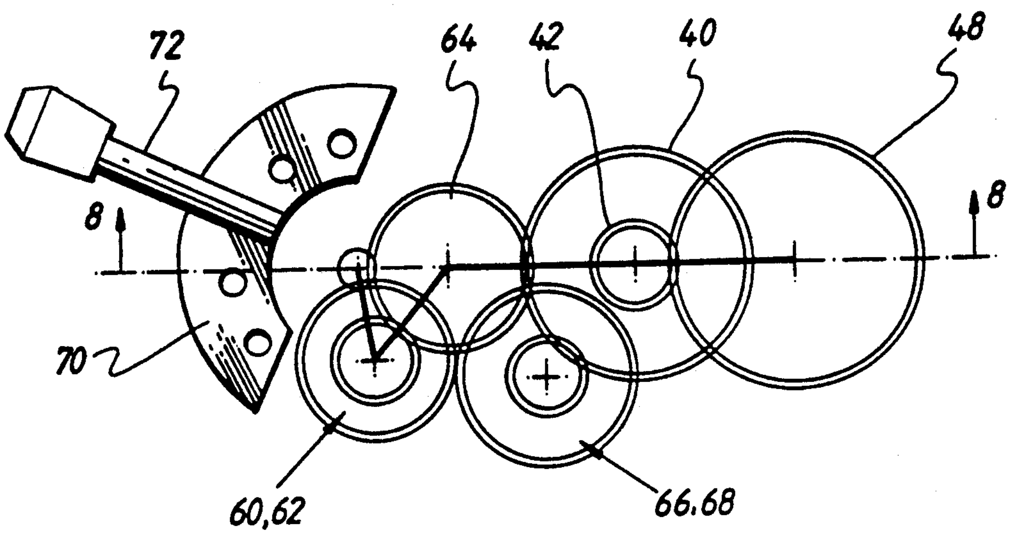
FIGS. 7 to 10 are views which illustrate the arrangement of gearing in the modified apparatus.
Figure 8:
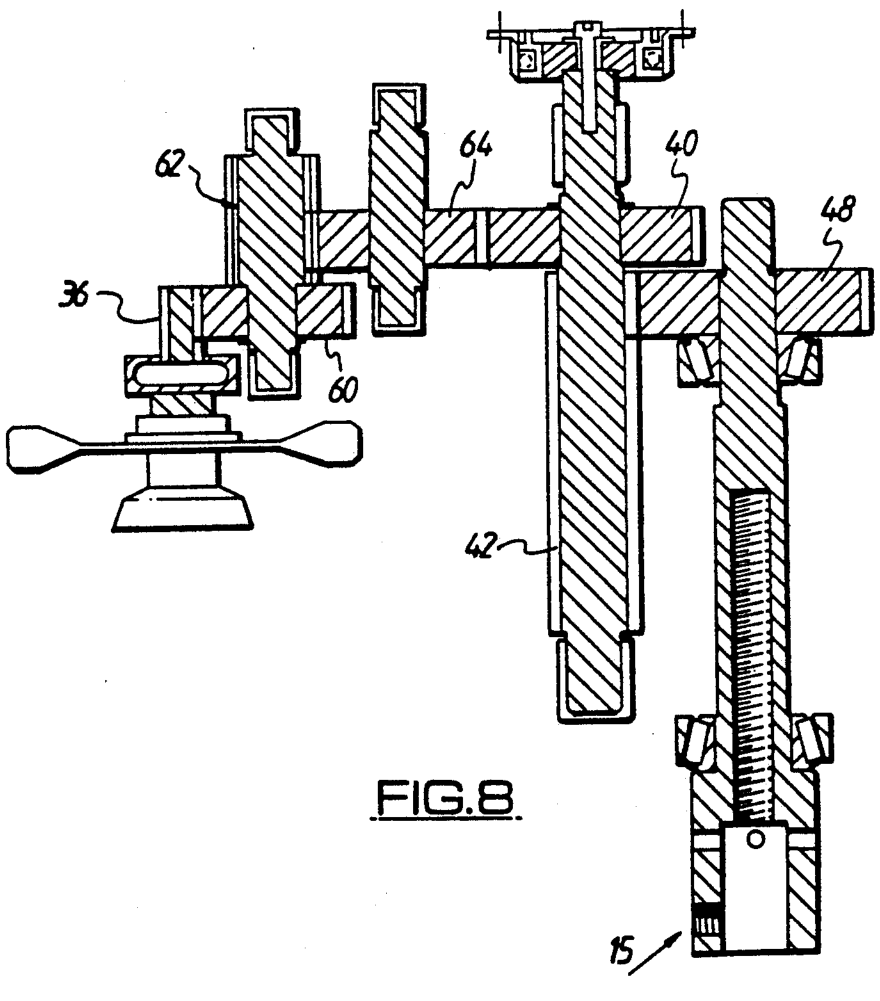
Figure 9:
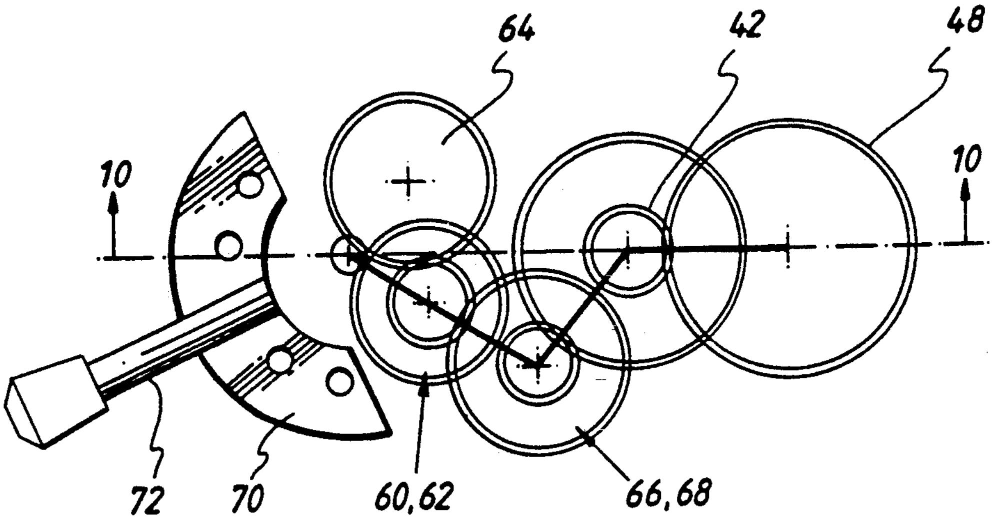
Figure 10:
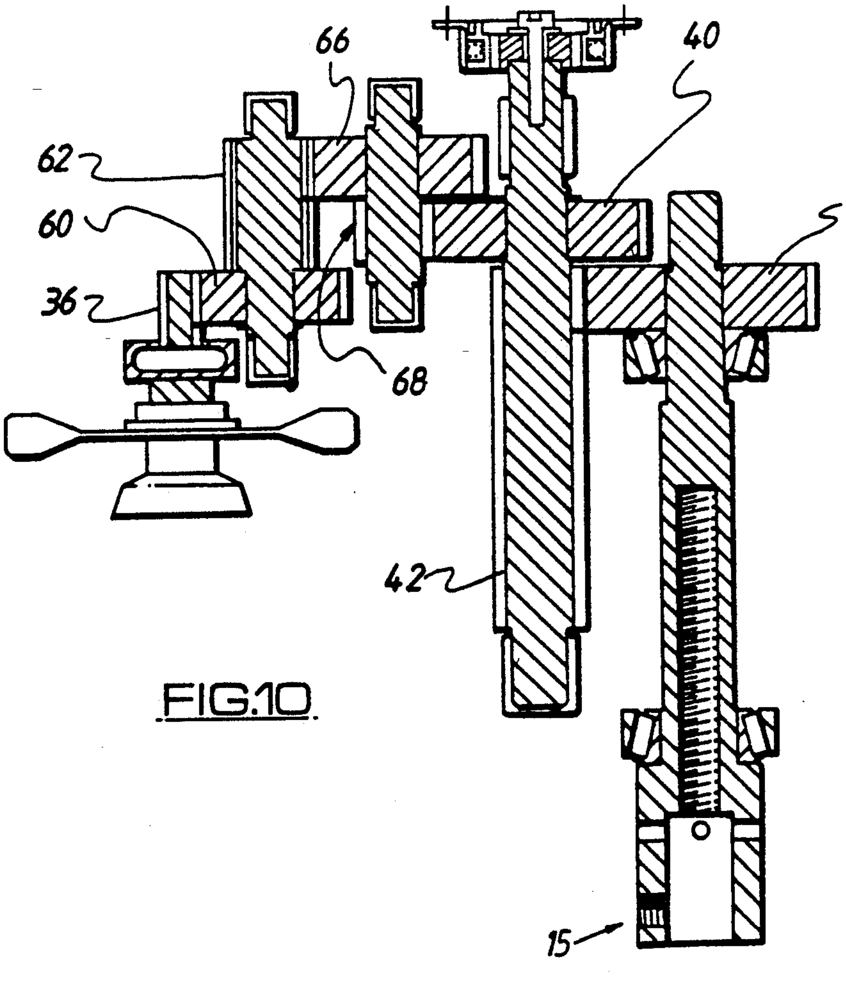

Referring now to FIGS. 6 to 10, in a modification of the apparatus described above, the attached handle 11 has been replaced by handles 101 cast integrally with the anvil member 10. In addition, the gear train between the pinion 36 and the elongate helical gear 42 has been modified to provide a 2-speed drive to the cutter. The reduction gears 38 and 40 have been replaced by stepped gears 60,62 and gear 64 and stepped gears 66,68. The stepped gears 60, 62 and gear 64 are located in a movable housing 70 carried by the head part of the anvil. A handle 72 carried by the housing 70 extends through a slot in the head part of the anvil, as shown in FIG. 6, and can be moved to alternate positions as indicated diagrammatically in FIGS. 7 and 9 to engage different gear ratios. In FIGS. 7 and 8, the gear train is shown in a high speed ratio, the drive from pinion 36 being transmitted through gear 60 and gear pair 62,64 to gear 40. In FIGS. 9 and 10, the gear train is shown in a low speed ratio, the drive from pinion 36 being transmitted through gear 60, gear pair 62,66 and gear 68 to gear 40.

Figure 11:
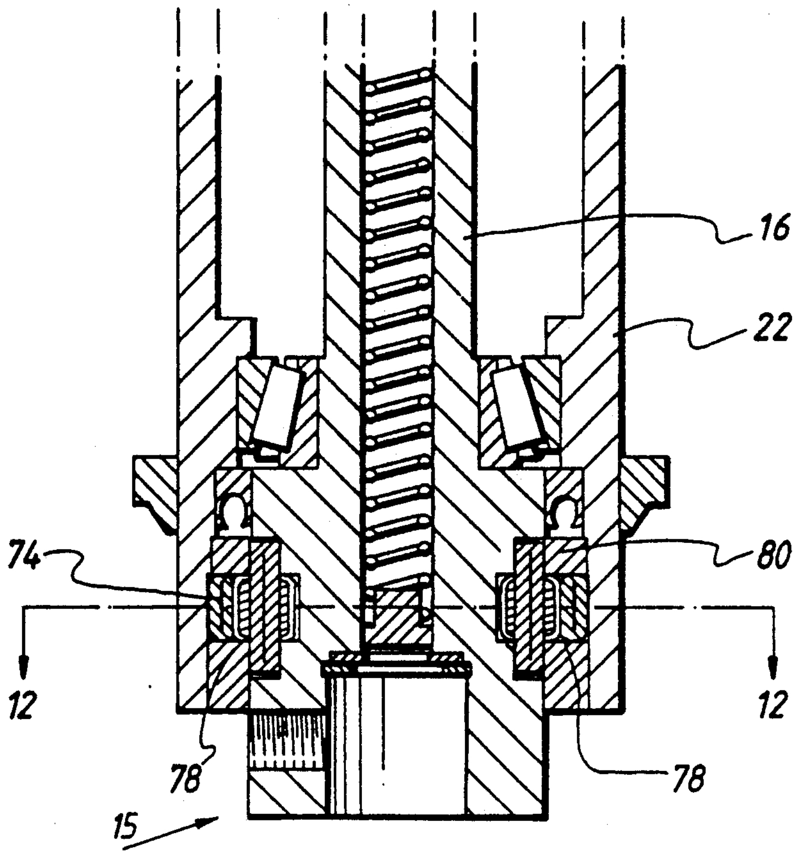
FIG. 11 is a view illustrating a further possible modification.
Figure 12:
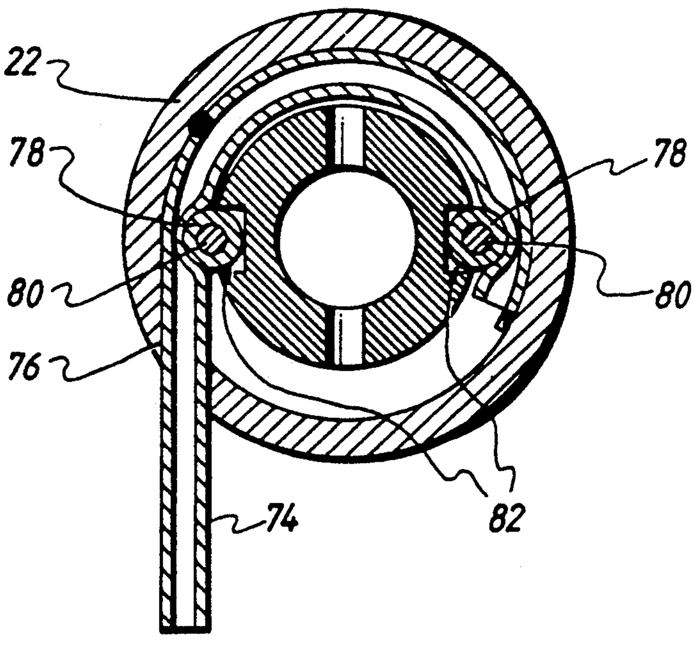
FIG. 12 is a sectional view on the line 12—12 in FIG. 11.

In FIGS. 11 and 12 there is illustrated a modification which can be made to either one of the illustrated embodiments referred to, this being the provision of a simple lubricant pump in the cylindrical sleeve 22 within which the drive spindle 16 is rotatably mounted. The pump is a peristaltic pump including a length of rubber tube 74 which has been fed through a hole 76 tangential to the bore of the sleeve. A pair of rollers 78,78 rotatable on respective spindles 80,80 carried in oppositely disposed slots 82 in the drive spindle 16, are arranged to engage the radially inner wall of that part of the tube which extends around the bore of the sleeve.

Although the drive spindle in each of the illustrated examples is shown to be provided with a milling type cutter capable of removing a slug of material from a work member, it will be understood that it will be capable of being fitted with any other suitable cutter or drill bit.

I claim:

1. Portable drilling apparatus comprising a support provided with means for securing the apparatus to a work member, and an axially displaceable drill spindle mounted in the support, a drive motor for the spindle being held in a fixed position in the support, and the spindle being held rotatably but axially fixed in an elongate member, said elongate member being slidably engaged by the support for movement with said spindle in said axial direction, a drive transmission between said motor and spindle comprising an elongate toothed transmission element rotatable about an axis parallel to the spindle and a further rotary toothed element fixed to the spindle and being drivingly engaged by the elongate transmission element, feed means for providing axial movement of the spindle comprising a screw rotatable about an axis parallel to the axis of the elongate member and having threaded engagement with a nut carried by said elongate member, and means for rotating said screw, the elongate toothed transmission element and said screw being located in a common length of the support.

2. Drilling apparatus according to claim 1, wherein a change speed mechanism is provided in the drive transmission between the motor and the spindle.

3. Drilling apparatus according to claim 2, wherein said change-speed mechanism is disposed to one side of the motor and spindle rearwards of the spindle.

4. Portable drilling apparatus comprising a support provided with means for securing the apparatus to a work member, and an axially displaceable drill spindle mounted in the support, a drive motor for the spindle being held in a fixed position in the support, and the spindle being held rotatably in and axially fixed to a member which is elongate in said direction of axial displacement, said elongate member comprising a mounting member having an end portion in the form of a cylindrical element formed integrally with an offset cylindrical sleeve within which the drive spindle is rotatably mounted, said cylindrical element and said sleeve being slidably mounted in respective cylindrical bores in the support for movement in said axial direction and thereby entraining the drill spindle for said axial displacement thereof, a drive transmission between said motor and spindle comprising an elongate transmission element rotatable about an axis parallel to the spindle and a further rotary element drivingly engaged by the elongate transmission element and displaceable with said elongate member holding the spindle, said elongate transmission element extending through an aperture in the cylindrical element of the mounting member.

5. Portable drilling apparatus according to claim 4, further comprising feed means for providing axial movement of the spindle, said feed means comprising a screw rotatable about an axis parallel to the axes of the cylindrical element and of the offset cylindrical sleeve of the elongate member and having threaded engagement with a nut carried by said cylindrical element, and means for rotating said screw.

6. Drilling apparatus according to claim 4, wherein a change speed mechanism is provided in the drive transmission between the motor and the spindle.

7. Drilling apparatus according to claim 6, wherein said change-speed mechanism is disposed to one side of the motor and spindle rearwards of the spindle.

8. Portable drilling apparatus comprising a housing provided with means for securing the apparatus to a work member, and an axially displaceable drill rotatably supported in an elongate member mounted in the housing, a drive motor for the spindle being held in a fixed position in the support, said member being displaceable in the housing in said axial direction for said displacement of the spindle in said axial direction, said drive motor and a drive transmission being located within the housing, said motor being held in a fixed position in the housing and driving an elongate element of said transmission rotatable about an axis parallel to the spindle, a further rotary element of said transmission being drivingly engaged by the elongate transmission element and displaceable with said elongate member holding the spindle, said elongate member comprising a mounting member having an end portion in the form of a cylindrical element formed integrally with an offset cylindrical sleeve within which the drive spindle is rotatably mounted, said cylindrical element and said sleeve being slidably mounted in respective cylindrical bores in the housing.

9. Portable drilling apparatus according to claim 8, further comprising feed means for providing axial movement of the spindle, said feed means comprising a screw rotatable about an axis parallel to the axes of the cylindrical element and of the offset cylindrical sleeve of the elongate member and having threaded engagement with a nut carried by said cylindrical element, and means for rotating said screw.

10. Drilling apparatus according to claim 8, wherein a change speed mechanism is provided in the drive transmission between the motor and the spindle.

11. Drilling apparatus according to claim 10, wherein said change-speed mechanism is disposed to one side of the motor and spindle rearwards of the spindle.

* * * * *